United States Patent
Sanjay et al.

(10) Patent No.: US 10,558,862 B2
(45) Date of Patent: Feb. 11, 2020

(54) EMOTION HEAT MAPPING

(71) Applicant: Intel Corporation, Santa Clara, CA (US)

(72) Inventors: Addicam V. Sanjay, Gilbert, AZ (US); Shao-Wen Yang, San Jose, CA (US); Siew Wen Chin, Penang (MY)

(73) Assignee: Intel Corporation, Santa Clara, CA (US)

(*) Notice: Subject to any disclaimer, the term of this patent is extended or adjusted under 35 U.S.C. 154(b) by 41 days.

(21) Appl. No.: 15/870,812

(22) Filed: Jan. 12, 2018

(65) Prior Publication Data

US 2019/0042854 A1    Feb. 7, 2019

(51) Int. Cl.
  *G06T 11/20* (2006.01)
  *G06K 9/00* (2006.01)
  *G10L 25/63* (2013.01)

(52) U.S. Cl.
  CPC ..... *G06K 9/00771* (2013.01); *G06K 9/00302* (2013.01); *G06K 9/00335* (2013.01); *G06T 11/206* (2013.01); *G10L 25/63* (2013.01)

(58) Field of Classification Search
  CPC combination set(s) only.
  See application file for complete search history.

(56) References Cited

U.S. PATENT DOCUMENTS

| | | | |
|---|---|---|---|
| 9,369,982 B2 | 6/2016 | Yang et al. | |
| 2014/0363059 A1* | 12/2014 | Hurewitz | G06Q 30/0201 382/118 |
| 2014/0365272 A1* | 12/2014 | Hurewitz | G06Q 30/0201 705/7.29 |
| 2014/0365333 A1* | 12/2014 | Hurewitz | G06Q 30/0643 705/26.9 |
| 2014/0365334 A1* | 12/2014 | Hurewitz | G06Q 30/0613 705/26.41 |
| 2015/0282111 A1 | 10/2015 | Yang et al. | |
| 2016/0379225 A1* | 12/2016 | Rider | G06Q 30/0201 382/116 |

* cited by examiner

*Primary Examiner* — Tsung Yin Tsai
(74) *Attorney, Agent, or Firm* — Alliance IP, LLC

(57) ABSTRACT

Localization data is accessed, which is based on information collected by one or more sensor devices deployed within an environment. The localization data identifies presence of a person within a particular location within the environment. A feature vector is access, which includes values to describe a plurality of different physical characteristics of the person as measured by a set of one or more sensor devices deployed within the environment when the person was present within the particular location. An emotion of the person is determined from the feature vector data, and the emotion is associated with the particular location within the environment. An emotion heat map is generated of the environment to map emotional responses determined within the environment to specific locations within the environment.

20 Claims, 9 Drawing Sheets

US 10,558,862 B2

EMOTION HEAT MAPPING

TECHNICAL FIELD

This disclosure relates in general to the field of computer systems and, more particularly, to machine-to-machine system analytics.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general-purpose computing devices, such as traditional desktop computers in recent years. Increasingly, tasks traditionally performed on general-purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

Like reference numbers and designations in the various drawings indicate like elements.

DETAILED DESCRIPTION OF EXAMPLE EMBODIMENTS

Figure 1A:
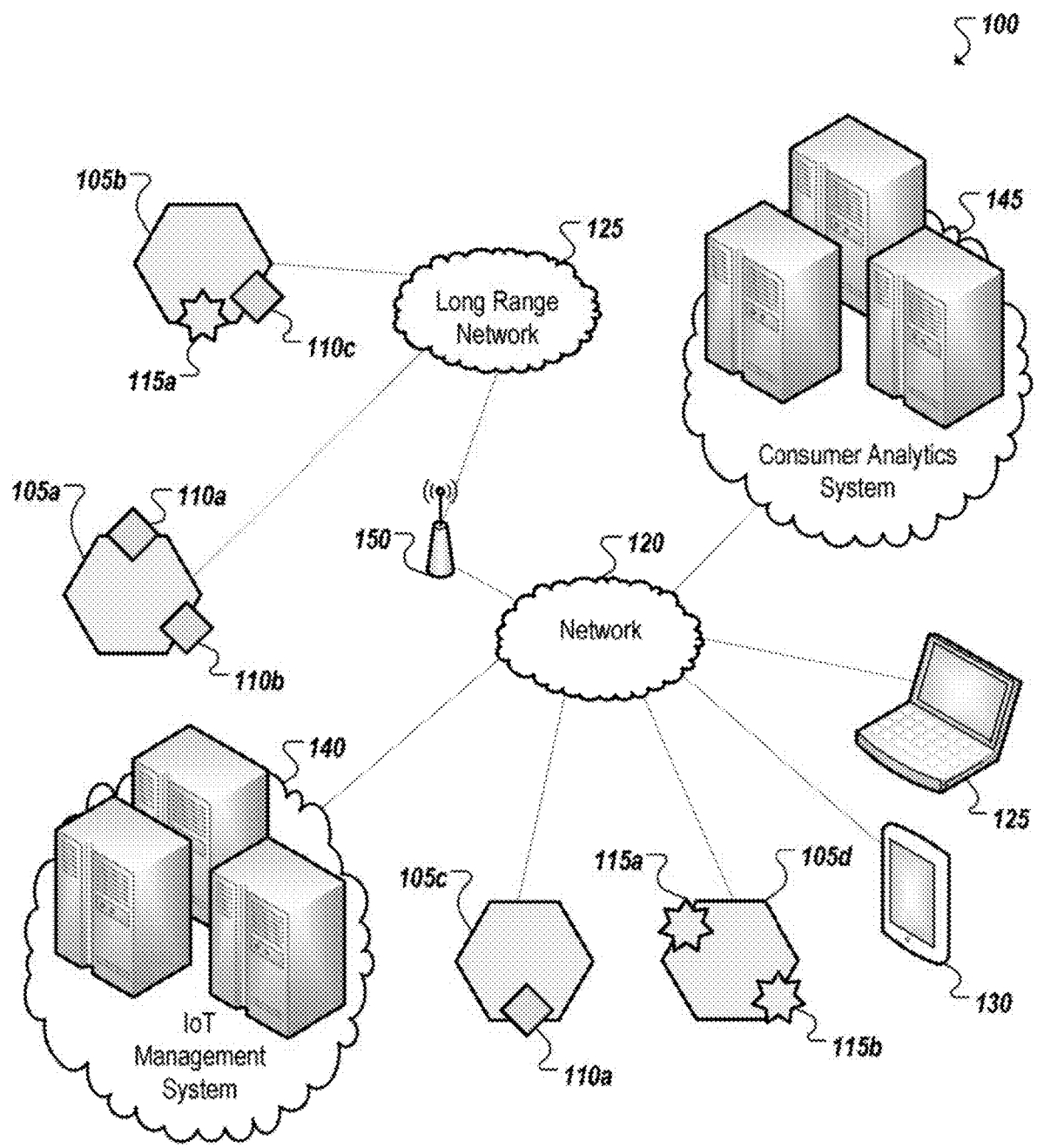
FIG. 1A illustrates an embodiment of a system including sensor devices adapted for and an example management system.

FIG. 1A is a block diagram illustrating a simplified representation of a system 100 that includes one or more devices 105a-d, or assets, deployed throughout an environment. Each device 105a-d may include a computer processor and/or communications module to allow each device 105a-d to interoperate with one or more other devices (e.g., 105a-d) or systems in the environment. Each device can further include one or more instances of various types of sensors (e.g., 110a-c), actuators (e.g., 115a-b), storage, power, computer processing, and communication functionality which can be leveraged and utilized (e.g., by other devices or software) within a machine-to-machine (M2M), or Internet of Things (IoT) system or application. In some cases, inter-device communication and even deployment of an IoT application may be facilitated by one or more gateway devices (e.g., 150) through which one or more of the devices (e.g., 105a-d) communicate and gain access to other devices and systems in one or more networks (e.g., 120).

In some instances, devices (e.g., 105c-d) may be configured with communication modules to support communication over local area networks, using communication technologies such as Wi-Fi, Bluetooth, Zigbee, etc. Such devices (e.g., 105c-d) may participate in a local area network of a home, office, manufacturing facility, warehouse, or other environment. In some cases, devices (e.g., 105c-d) may utilize these short-range wireless channels to connect to a wide area network 120 (such as the Internet through a local gateway). Such devices may utilize these local wireless channels to participate in a M2M or IoT system. M2M or IoT systems may additionally be formed to include remote devices (e.g., 105a-b).

Remote devices 105a-b may be remote from a primary location for which an example IoT system is launched. In some cases, there may be no primary location associated with ah IoT system deployment. Indeed, in some cases, each of the devices (e.g., 105a-d) may be remotely located with respect to one another. Further, in some implementations, devices (e.g., 105a-b) may connect over long-range wireless channels (e.g., of a long-range network 125). For instance, devices (e.g., 105a-b) may be capable of communicating over long range radio 125, such that a device (e.g., 105a) may communicate with another sensor device 105b or gateway device 150 that is located several kilometers away (e.g., 10-30 km). Further, by connecting to a gateway device (e.g., 150) over a long-range wireless network 125, devices (e.g., 150a-b) that may otherwise not have access to the Internet or other networks (e.g., 120) may be able to connect to such networks 120 and report to or access data from system (e.g., 15c-d, 130, 135, 140, 145) connecting to these networks 120. As an example, a sensor device (e.g., 105a) deployed within a field, mountain, solar farm, remote highway, or other less populated area (where cellular or other network connectivity is limited), may utilize a long range wireless radio network 125 to participate in an M2M or IoT system (e.g., including other devices connected to the long range network 125 or devices connected through another more traditional network (e.g., 120), such as one utilizing or otherwise supporting Internet Protocol (IP). The gateway device 150 may thereby function as an IP router for the LPWA-enabled endpoints to which it connects.

Sensors, or sensor assets, are capable of detecting, measuring, and generating sensor data describing characteristics of the environment in which they reside, are mounted, or are in contact with. For instance, a given sensor (e.g., 110a-c) may be configured to detect one or more respective characteristics such as movement, weight, physical contact, temperature, wind, sound, light, computer communications, wireless signals, visual images, position, flow, pressure, humidity, the presence of radiation, liquid, heartbeats and respiration of living things (e.g., humans and animals), other devices, or specific chemical compounds, among several other examples. Indeed, sensors (e.g., 110a-c) as described herein, anticipate the development of a potentially limitless universe of various sensors, each designed to and capable of detecting, and generating corresponding sensor data for, new and known environmental characteristics and information. Actuators (e.g., 115a-b) can allow the device to perform some kind of action to affect its environment. For instance, one or more of the devices (e.g., 105b, d) may include one or more respective actuators that accepts an input and performs (or triggers) an action in response. Actuators can include controllers to activate additional functionality, such as an actuator to selectively toggle or otherwise adjust the power or operation of an alarm, camera (or other sensors), heating, ventilation, and air conditioning (HVAC) appliance, household appliance, in-vehicle device, lighting, image displays (e.g., advertisements or ambient video programming), ambient music, among other examples.

In some implementations, sensors 110a-c and actuators 115a-b provided on devices 105a-d can be assets incorporated in and/or forming an Internet of Things (IoT) or machine-to-machine (M2M) system. IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105a-d), such as devices sourced or controlled by varied groups of entities and employing varied hardware, operating systems, software applications, and technologies. In some cases, a gateway (e.g., 150) may be provided to localize a particular IoT system, with the gateway able to detect nearby devices (e.g., 105a-d) and deploy (e.g., in an automated, impromptu manner) an instance of a particular IoT application by orchestrating configuration of these detected devices to satisfy requirements of the particular IoT application, among other examples.

As shown in the example of FIG. 1A, multiple IoT devices (e.g., 105a-d) can be provided from which one or more different IoT applications can be built. For instance, a device (e.g., 105a-d) can include such examples as a mobile personal computing device, such as a smart phone or tablet device, a wearable computing device (e.g., a smart watch, smart garment, smart glasses, smart helmet, headset, etc.), purpose-built devices such as and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), smart traffic management, driverless vehicle control, smart agriculture, and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

Continuing with the example of FIG. 1A, software-based IoT management platforms can be provided to allow developers and end users to build and configure IoT applications and systems. An IoT application can provide software support to organize and manage the operation of a set of IoT devices for a particular purpose or use case. In some cases, an IoT application can be embodied as an application on an operating system of a user computing device (e.g., 130), a mobile app for execution on a smart phone, tablet, smart watch, or other mobile device (e.g., 135), a remote server, and/or gateway device. In some cases, the application can have or make use of an application management utility allowing users to configure settings and policies to govern how the set devices (e.g., 105a-d) are to operate within the context of the application. As an example, IoT devices (e.g., 105a-d) and data generated by sensors (e.g., 110a-c) on the devices may be utilized to facilitate one or more applications or functions of an example consumer analytics system to analyze behaviors of customers or consumers of goods and services offered within a particular physical environment. As an example, sensors (e.g., 110a-c) deployed within a commercial, educational, hospitality, or other consumer environment may be used to detect emotions of individual persons within the environment and generate data (e.g., heat maps) to identify trends and tendencies of persons' emotional responses within the environment.

In some implementations, a management utility can also be used to orchestrate the deployment of a particular instance of an IoT application, including the automated selection and configuration of devices (and their assets) that are to be used with the application. In some cases, an IoT management application may be provided (e.g., on a gateway, user device, or cloud-based server, etc.), which can manage potentially multiple different IoT applications or systems. Indeed, an IoT management application, or system, may be hosted on a single system, such as a single server system (e.g., 140), a single end-user device (e.g., 130, 135), or a single gateway device, among other examples. Alternatively, an IoT management system can be distributed across multiple hosting devices (e.g., 130, 135, 140, 150, etc.).

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 140, 145). For instance, the IoT system can connect to a remote service (e.g., 145) over one or more networks 120, 125. In some cases, the remote service can, itself, be considered an asset of an IoT application. Data received by a remotely-hosted service can be consumed by the governing IoT application and/or one or more of the component IoT devices to cause one or more results or actions to be performed, among other examples.

One or more networks (e.g., 120, 125) can facilitate communication between sensor devices (e.g., 105*a-d*), end user devices (e.g., 130, 135), gateways (e.g., 150), and other systems (e.g., 140, 145) utilized to implement and manage IoT applications in an environment. Such networks can include wired and/or wireless local networks, public networks, wide area networks, long range low power networks, broadband cellular networks, satellite networks, the Internet, and the like. Gateway devices (e.g., 150) may be utilized to effectively bridge communications between networks. For instance, a gateway device (e.g., 150) may receive data from a long-range network 125 and process the data for forwarding on the Internet (e.g., 120) and likewise receive data from resources on the Internet 120 and process the data for forwarding to devices (e.g., 105*a-b*) connected to long range network 125, among other examples. A gateway device (e.g., 150) may be implemented as a dedicated gateway element, or may be a multi-purpose or general-purpose device, such as another IoT device (similar to devices 105*a-d*) or user device (e.g., 130, 135) that itself may include sensors and/or actuators to perform tasks within an IoT system, among other examples.

In general, "servers," "clients," "computing devices," "network elements," "hosts," "system-type system entities," "user devices," "gateways," "IoT devices," "sensor devices," and "systems" (e.g., 105*a-d*, 130, 135, 140, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1A is described as containing or being associated with a plurality of elements, not all elements illustrated within computing environment 100 of FIG. 1A may be utilized in each alternative implementation of the present disclosure. Additionally, one or more of the elements described in connection with the examples of FIG. 1A may be located external to computing environment 100, while in other instances, certain elements may be included within or as a portion of one or more of the other described elements, as well as other elements not described in the illustrated implementation. Further, certain elements illustrated in FIG. 1A may be combined with other components, as well as used for alternative or additional purposes in addition to those purposes described herein.

As noted above, a collection of devices, or endpoints, may participate in Internet-of-things (IoT) network, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), LPWA networks, and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

Figure 1B:
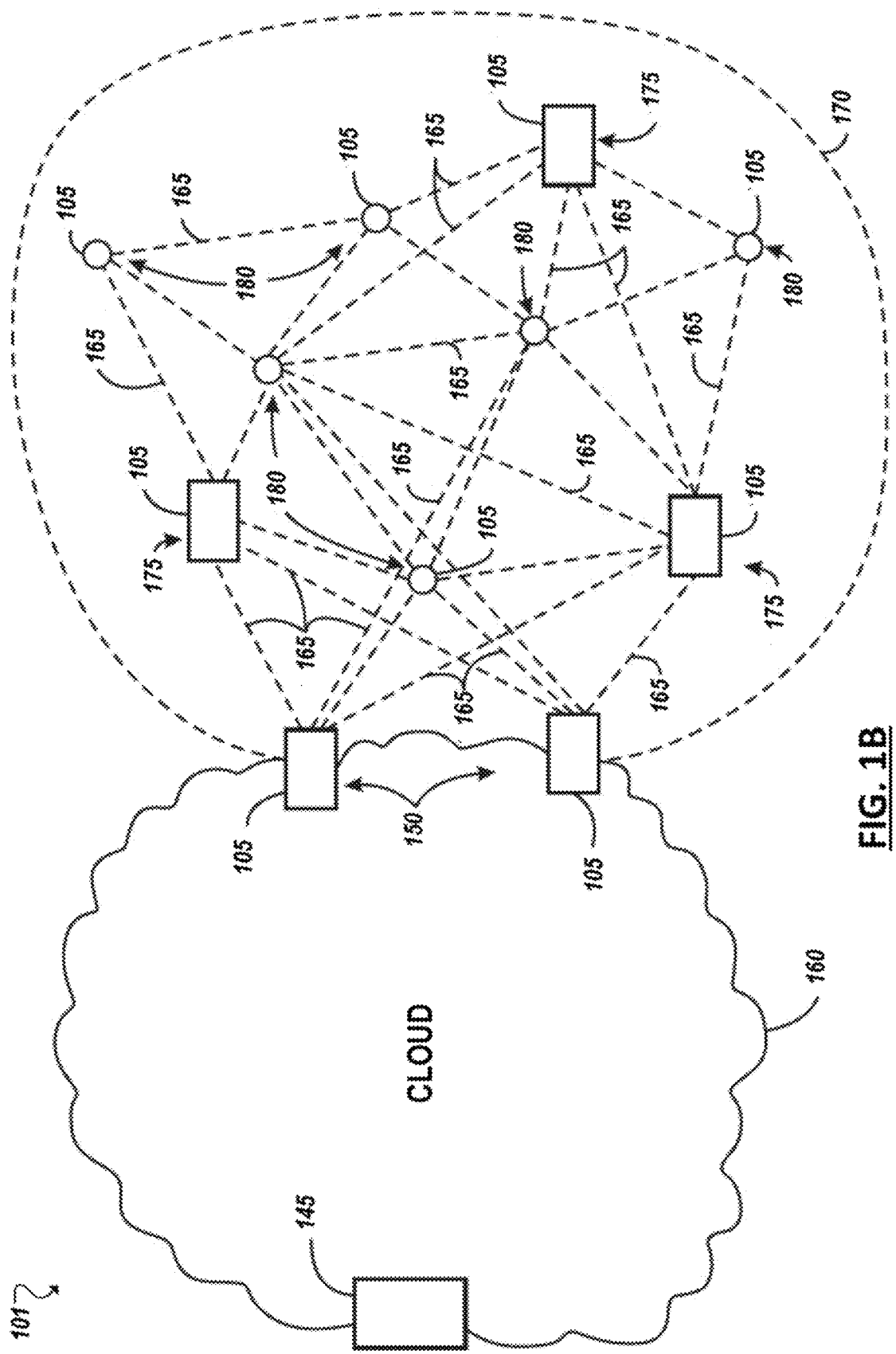
FIG. 1B illustrates an embodiment of a cloud computing network.

As shown in the simplified block diagram 101 of FIG. 1B, in some instances, a cloud computing network, or cloud, in communication with a mesh network of IoT devices (e.g., 105*a-d*), which may be termed a "fog," may be operating at the edge of the cloud. In some implementations, an IoT application (e.g., an emotion heat map generator) may be implemented, in whole or in part using computing devices and resources located in the fog. To simplify the diagram, not every IoT device 105 is labeled.

The fog 170 may be considered to be a massively interconnected network wherein a number of IoT devices 105 are in communications with each other, for example, by radio links 165. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 105 are shown in this example, gateways 150, data aggregators 175, and sensors 180, although any combinations of IoT devices 105 and functionality may be used. The gateways 150 may be edge devices that provide communications between the cloud 160 and the fog 170, and may also function as charging and locating devices for the sensors 180. The data aggregators 175 may provide charging for sensors 180 and may also locate the sensors 180. The locations, charging alerts, battery alerts, and other data, or both may be passed along to the cloud 160 through the gateways 150. As described herein, the sensors 180 may provide power, location services, or both to other devices or items.

Communications from any IoT device 105 may be passed along the most convenient path between any of the IoT devices 105 to reach the gateways 150. In these networks, the number of interconnections provide substantial redundancy, allowing communications to be maintained, even with the loss of a number of IoT devices 105.

The fog 170 of these IoT devices 105 devices may be presented to devices in the cloud 160, such as a server 145, as a single device located at the edge of the cloud 160, e.g., a fog 170 device. In this example, the alerts coming from the fog 170 device may be sent without being identified as coming from a specific IoT device 105 within the fog 170. For example, an alert may indicate that a sensor 180 needs to be returned for charging and the location of the sensor 180, without identifying any specific data aggregator 175 that sent the alert.

In some examples, the IoT devices 105 may be configured using an imperative programming style, e.g., with each IoT device 105 having a specific function. However, the IoT devices 105 forming the fog 170 may be configured in a declarative programming style, allowing the IoT devices 105 to reconfigure their operations and determine needed resources in response to conditions, queries, and device failures. Corresponding service logic may be provided to dictate how devices may be configured to generate ad hoc assemblies of devices, including assemblies of devices which function logically as a single device, among other examples. For example, a query from a user located at a server 145 about the location of a sensor 180 may result in the fog 170 device selecting the IoT devices 105, such as particular data aggregators 175, needed to answer the query. If the sensors 180 are providing power to a device, sensors associated with the sensor 180, such as power demand, temperature, and the like, may be used in concert with sensors on the device, or other devices, to answer a query. In this example, IoT devices 105 in the fog 170 may select the sensors on particular sensor 180 based on the query, such as adding data from power sensors or temperature sensors. Further, if some of the IoT devices 105 are not operational, for example, if a data aggregator 175 has failed, other IoT devices 105 in the fog 170 device may provide substitute, allowing locations to be determined.

Further, the fog 170 may divide itself into smaller units based on the relative physical locations of the sensors 180 and data aggregators 175. In this example, the communications for a sensor 180 that has been instantiated in one portion of the fog 170 may be passed along to IoT devices 105 along the path of movement of the sensor 180. Further, if the sensor 180 is moved from one location to another location that is in a different region of the fog 170, different data aggregators 175 may be identified as charging stations for the sensor 180.

As an example, if a sensor 180 is used to power a portable device in a chemical plant, such as a personal hydrocarbon detector, the device will be moved from an initial location, such as a stockroom or control room, to locations in the chemical plant, which may be a few hundred feet to several thousands of feet from the initial location. If the entire facility is included in a single fog 170 charging structure, as the device moves, data may be exchanged between data aggregators 175 that includes the alert and location functions for the sensor 180, e.g., the instantiation information for the sensor 180. Thus, if a battery alert for the sensor 180 indicates that it needs to be charged, the fog 170 may indicate a closest data aggregator 175 that has a fully charged sensor 180 ready for exchange with the sensor 180 in the portable device.

It is believed that growing an emotional connection with customers can drive gain in customer value across various consumer industries, including retail, technology, financial services, hospitality, and other industries providing goods or services to consumers, and this is one of the main factors behind revenue acceleration in such industries. Accordingly, such industries are increasingly interested in better understanding customers' emotion, as creating an emotional bond with a brand has been shown to be a key differentiator in the marketplace.

Traditionally, understanding and researching consumer's emotions has relied on manual, surveys, volunteer online- or telephone-automated surveys, and other techniques, which may not reflect consumers' real time emotions (instead reflecting the user's subsequent interpretation and recognition of emotions experienced in the past) and may represent a skewed sample (e.g., where only those consumers with time, comfort level, or interest to elect to participate in the survey of their emotions are surveyed). Modern sensor, network, computing, and machine learning techniques are enabling emotional responses of persons (and even animals) to be detected autonomously. For instance, emotion can be analyzed based on various types of input data captured from vision sensor(s), audio sensor(s), or wearable sensor(s). Such information, however, is may be incomplete and limited to those targeted physical locations where sufficient sensors are present. Further, business analytics applied to such data may be incomplete and lacking.

Heat map analysis may serves as a key analytic tool to make business decision in various sectors. In one example, a computing system may be provided with functionality to develop heat maps to precisely reflect customer-product engagement and/or customer mood change during a customer's visit to a particular physical environment associated with a transaction. For instance, a multi-modal crowd emotion heat map may be generated, which can be used to represent the crowd in the designated bricks-and-mortar. In particular, emotion detection logic may be employed to extract and aggregate emotion information from the various individuals within the environment. Aggregated emotion information may serve to form an emotional "footprint" for the crowd of consumers visiting various locations within the environment. Individual consumers' emotions may be detected from input sensors within the environment such as vision, audio, Wi-Fi, and sensors provided on wearable (and other) devices (e.g., voice and speech recognition, accelerometers, gyroscopes, heartbeat detection, respiration monitors, etc.), among other examples. Subsequently, the emotion detected from the individual may be classified and aggregated with respect to the corresponding location to generate the emotion heat map for crowd emotion analytics. The emotion heat map can then be used to integrate with other information describing the business and its environment, such as planogram data. Business analytics may be performed to generate results based on the emotion heat map to provide feedback to the staff in store real-time/near real-time to take necessary engagement with the customers.

Figure 2:
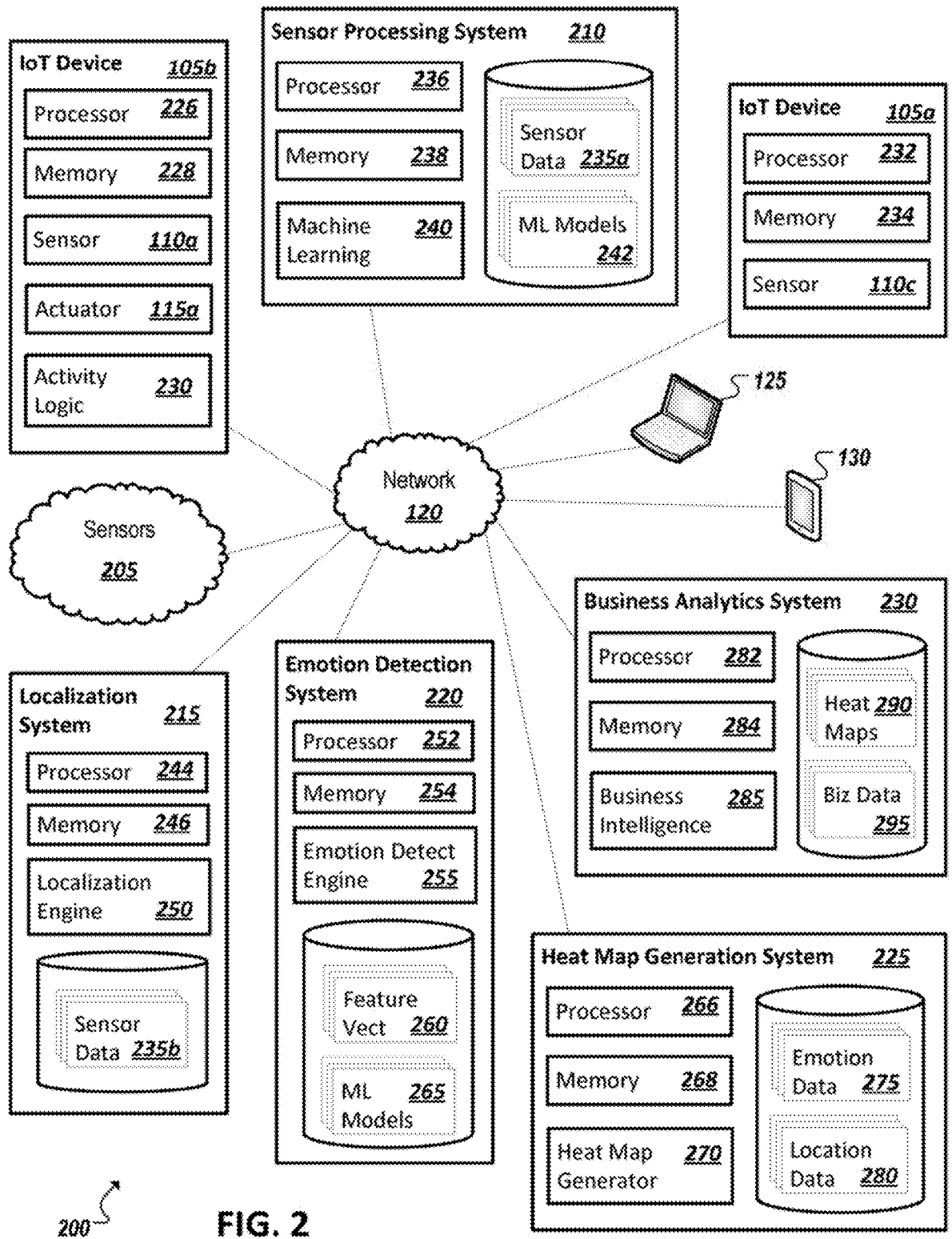
FIG. 2 illustrates an embodiment of a system including an example hat map generation system and one or more sensor devices.

Systems, such as those shown and illustrated herein, may include machine logic implemented in hardware and/or software to implement the solutions introduced herein and address at least some of the example issues above and implement features and applications, such as those introduced above (among others). For instance, FIG. 2 shows a simplified block diagram 200 illustrating a system including multiple IoT devices (e.g., 105*a-b*) with assets (e.g., sensors (e.g., 110*a-b*) and/or actuators (e.g., 115*a*)) capable of being used in a variety of different IoT applications. For instance, the sensors 110*a-b* of the example devices 105*a-b* and other sensors (e.g., 205) may be used to generate sensor data (e.g., 235*a-b*), which may be consumed by one or more systems implementing a business analytics platform that can generate and use emotion heat maps, such as introduced above. In one example, the system may include sub-systems such as a sensor processing system 210, localization system 215, emotion detection system 220, heat map generation system 225, and business analytics system 230, among other examples. While the subsystems (e.g., 210, 215, 220, 225, 230, etc.) are represented in FIG. 2 as separate systems, it should be appreciated that two or more (or all) of these subsystems may be hosted on the same physical computing system in some implementations. Further, one or more of the subsystems (e.g., 210, 215, 220, 225, 230, etc.) may be hosted on multiple physical computing systems, such as instances where a subsystem is implemented in a distributed computing system such as a cloud- or fog-based system, among other example implementations.

In one example, a sensor processing system 210 may include one or more data processors (e.g., 236), one or more computer-readable memory elements (e.g., 238), and one or more components implemented in software, firmware, and/or hardware circuitry, such as a machine learning module 240. A sensor processing system 210 may collect data generated from various sensors (e.g., 110*a-b*, 205, etc.) and determine a subset of the sensor data (e.g., 235*a*) for use by downstream processes or systems. For instance, the sensor processing system 210 may utilize one or more machine learning modules (e.g., decision trees, random forests, neural networks, etc.) to determine feature vectors from the sensor data (e.g., 235*a*) received from one or more sensor devices (or a gateway, IoT management system, or other systems facilitating communication between sensor devices and the sensor processing system 210). For instance, within snapshots of time, multiple different sensors (e.g., 110*a-b*, 205) may measure an environment and collect a variety of different data describing or representing observations of the sensors.

In some cases, the information presented in this sensor data may be of little use to one or more downstream processes, or systems, such as an emotion detection system 220 or localization system 215, among other examples. For instance, when there is little activity near a sensor or commonplace activity near a sensor, the information represented in corresponding sensor data may be of little use, for instance, in determining or detecting a noteworthy event or condition within the environment in which the sensors are deployed. A machine learning module 240 may be used, in some implementations, to receive data sets collected by multiple sensors and determine which values and combinations of values in the data sets are likely to be useful by downstream functionality. For instance, the machine learning module 240 may make use of one or more machine learning models (e.g., 242) to derive, from a set of sensors data from multiple sensors, a feature vector that includes a combination of values, which the machine learning module 240 detects as being useful to a particular downstream process or subsystem, such as in the detection of a particular user within a particular location in the environment (e.g., using localization system 215) or detecting an emotional response of the particular user (e.g., using an emotion detection system 220), among other examples. Indeed, in the example of FIG. 2, the sensor processing system 210 takes, as an input, raw sensor data 235*a* generated by a variety of sensors (e.g., 110*a-b*, 205) deployed within a physical environment to generate one or more feature vectors (e.g., 260), which it may send, store in shared memory, or otherwise provide for use by a downstream system or process, such as the emotion detection engine of an example emotion detection system 220, among other examples.

A localization system 215 may also make use of sensor data (e.g., 235*b*) (or feature vectors generated from the sensor data). Specifically, an example localization system 215 may process sensor data (e.g., 235*b*) generated by one or more sensors within an environment to determine that particular users are present in particular locations within the environment. In one example, a localization system 215 may include one or more data processors (e.g., 252), one or more computer-readable memory elements (e.g., 254), and one or more components implemented in software, firmware, and/or hardware circuitry, such as a localization engine 250. In some implementations, a localization engine 250 may employ localization functions, machine learning algorithms, and other techniques to identify individual persons within an environment and further identify these persons' positions within the environment. For instance, within a retail store, the locations and movement of particular consumers within the retail store environment may be detected and tracked, using sensor data 235*b* as inputs, such as video sensor data (and other image data), infrared (IR) sensor data, voice sensor data, among other example information. The localization engine 250 may determine the unique identities of the people within the store (while applying security measures to anonymize the data 235*b*) using facial recognition, voice recognition, and other recognition techniques (e.g., based on the clothing of the person, the gait or other gestures used by the person, and other identifying characteristics captured in the sensor data 235*b*). These recognition techniques may be combined with localization processing to determine when a particular person enters or exits a particular area, or location, within the store, as well as how and where the particular person moves while in the store, among other example results. Accordingly, an example localization engine 250 may generate data to detect a particular person and that person's location(s) detected within a physical environment. This information may be encapsulated and described, for instance, in location data (e.g., 280) generated by the localization system 215 and provided to one or more other processes and/or subsystems within the system (e.g., heat map generation system 225). As one illustrative example, a sensor fusion approach may be utilized to localize customers within a physical environment. For instance, active radio beacon sensors may be used in cooperation with camera sensors (e.g., a RGB-D camera), such that radio signals (e.g., cellular data, Wi-Fi, Bluetooth, Near Field Communication (NFC), or other signals) emitted from smartphones, wearables, or other computing devices carried by persons within the environment are sensed to track the device carriers' respective whereabouts within the environment, while camera sensors are used to refine the estimated position of the user (and attribute physical identifiers to the individual persons to assist in tracking the person's movement within the environment), among other example implementations.

As noted above, an emotion detection system 220 may utilize data generated from multimodal sensors (e.g., 110*a-b*, 205, etc.) to detect emotions exhibited by particular persons within a physical environment. An example emotion detection system 220 may include one or more data processors (e.g., 252), one or more computer-readable memory elements (e.g., 254), and one or more component implemented in software, firmware, and/or hardware circuitry, such as an emotion detection engine 255, among other examples. In this example, an emotion detection system 220, rather than operating and taking as inputs raw sensor data (e.g., 235*a-b*) generated by groupings of multimodal sensors deployed within the physical environment, may utilize pre-processed data, such as embodied in feature vector data 260 generated from the raw sensors data (e.g., 235a) by an example sensor processing system 210. In other implementations, an example emotion detection engine 255 may process raw sensor data directly to make predictions or determinations regarding emotional conditions of individual persons whose characteristics are captured by the sensors (e.g., 110a-b, 205) within the environment.

In some implementations, an example emotion detection engine 255 may utilize machine learning models to operate upon features or feature vectors (e.g., 260) derived from sensor data generated by sensors in the environment. The emotion detection engine 255 may then output an indication of one or more emotions the emotion detection engine 255 determines to have been presented by a particular user on the basis of the features provided in the feature vector 260 (corresponding to observed physical characteristics of the person at a particular point in time (while the person was within a particular location)). Such characteristics may include, for instance, the words or sounds spoked by the person, the voice inflections exhibited in the person's speech, gestures or posture exhibited by the person, the gait of the person, the facial expressions of the person, the heartbeat of the person, the respiration patterns of the person, among other example characteristics. As illustrative examples, a set of features may be extracted from video data and provided as an input to a neural network based model to recognize emotion displayed by users captured in the video (e.g., based on characteristics such a facial expression, gait, posture, and gestures capable of being captured in video). As a specific example, a hybrid network machine learning model may be used which integrates a recurrent neural network (RNN) with a 3D convolutional network (C3D) to encode appearance and motion information simultaneously to recognize emotion variation from video-based features. In another example, human emotion recognition may be implemented using gesture dynamics representing various levels of a subject person's posture. The extracted motion features may be modeled using support vector machines (SVM), Naïve Bayes and dynamic time wrapping (DTW) for human emotion classification, among other example emotion detection solutions. In still another example, wireless signal sensors may be utilized to detect heart beats of nearby persons. For instance, individual heartbeats may be extracted from a wireless signal sensor. Heartbeat patters and fluctuations may be used to detect the emotions experienced by the person. Accordingly, related emotion-dependent features may be fed to the machine-learning emotion classifier for emotion recognition, among other example implementations.

An emotion detection system 220 may generate emotion data 275 to describe the results of the analysis of features captured for various subjects (e.g., persons) by sensors (e.g., 110a-b, 205) within an environment. In one example emotion data 275 and location data 280 may be provided for processing by a heat map generation system 225. In one example, a heat map generation system 225 may include one or more data processors (e.g., 266), one or more computer-readable memory elements (e.g., 268), and one or more components implemented in software, firmware, and/or hardware circuitry, such as a heat map generator 270. In some implementations, a heat map generator 270 may take, as inputs, emotion data 275 and location data 280 captured within a particular physical environment (e.g., within a defined window of time) for one or more persons (to whom the location and emotion data corresponds), to generate a heat map for the particular environment, which describes the types (and, in some cases, degree(s)) of emotion detected within the particular environment corresponding to the particular locations within the particular environment in which the person was detected to be manifesting these emotions. In some cases, the heat map generator 270 may further utilize location data 280 and emotion data 275 captured from observation of multiple different persons (e.g., a crowd) within the physical environment over a period of time, and the emotion heat map generated by the heat map generator 270 may reflect the combined, average, median, or otherwise aggregated emotional characteristics of the crowd as experienced in specific locations within the environment.

In some implementations, an emotion heat map generated by a heat map generator 270 may be data that can be rendered into a graphical presentation (e.g., for display on user computing devices (e.g., 125, 130)). The emotion heat map data may be mapped to and presented as an overlay on a map or planogram representation of the physical environment to allow a user (e.g., a manager or planner of the environment) to gain a better understanding of how characteristics of various locations within the physical environment may affect consumers' emotions in positive or negative ways. The users may then use the information presented in the emotion heat map to make adjustments to the characteristics of the physical environment (e.g., the positioning of furniture or products on display, the volume of music output at speakers within particular points in the environment, the types of artwork, advertising, video, or other presentations provided in certain locations with the environment, the general layout of a store, classroom, auditorium, restaurant, or other physical environment, among other examples.

In some cases, results described in an emotion heat map may be utilized to trigger one or more actuators (e.g., 115a) to automate adjustments to environmental characteristics within an environment. For instance, based on trends described in the emotion heat map, the temperature within the environment may be controlled, music selection or volume may be changed (e.g., to try to counter or otherwise influence the emotions being experienced within the environment), change the type of images or video being displayed by a display device within the environment (to affect a change or reinforce emotions being detected within a location in the environment where the display is likely being seen and affecting emotions of viewers), among other examples. For instance, the type of emotion being experienced may be described in the emotion heat map, as well as the location in which the emotion is being experienced. Depending on the type of the described emotion and the location (and variable characteristics applicable to that location), the emotion heat map may be used directly to autonomously control characteristics within the environment. In still other examples, an emotion heat map may be processed to detect opportunities for staff members assigned to the environment to engage particular consumers (or generalized consumers) within the environment. Accordingly, an actuator may provide an automated alarm or notification in response to a detected emotional trend within the environment to spur staff members into action to capitalize on or correct the emotional tendencies described within the environment, among other examples.

In some implementations, a heat map generator 270 may map particular emotion observations to particular location data, so as to create a mapping between an individual observed emotion and the subject's location at the moment the emotion was detected. In some cases, emotion data 275 and location data 280 may be tagged with a user identifier (e.g., anonymized to protect the identity of the subject)

and/or a time identifier to assist in identifying, to the hat map generator 270, which emotion data 275 corresponds to which location data 280. In other example implementations, the heat map generator 270 may include logic to derive or infer relationships between the emotion data and location data directly (e.g., from time stamp, facial recognition, and other features discoverable from the data), among other example implementations.

As noted above, an emotion heat map (e.g., 290) generated by a heat map generation system 225 may be used to trigger a variety of actions and notifications, which human users may act upon. In some cases, emotion heat map data 290 may be further processed to derive additional insights, including longer term trends, how the emotion heat map (and variations in the heat map) correlate to performance metrics within the physical environment (e.g., volume of sales, average transaction size, types of transactions, etc.), among other example insights. For instance, a business analytics system (e.g., 230) may be provided that includes include one or more data processors (e.g., 282), one or more computer-readable memory elements (e.g., 284), and one or more components implemented in software, firmware, and/or hardware circuitry, such as a business intelligence modules (e.g., 285). In some implementations, business insight and intelligence modules 285 may utilize emotion heat maps (e.g., 290) in connection with other business data (e.g., 295), describing such characteristics as sales performance, a historical planogram of the physical environment, performance or behavior observed by persons within the physical environment, among other information, which may be processed with the emotion heat map 295 to derive additional insights.

Continuing with the description of FIG. 2, IoT devices (e.g., 105*a,b*) and other computing devices (e.g., including wearable devices, smartphones, and other user computing devices (e.g., 125, 130) may be include sensors, which may be used to detect either or both user location and physical characteristics, which may be shared with a system for use (with other sensor data) in detecting emotion of the user and developing an emotion heat map for a particular physical environment. Such devices (e.g., 105*a*, 150*b*, etc.) may include one or more processors (e.g., 226, 232), one or more memory elements (e.g., 228, 234), and one or more communications modules (not shown) to facilitate their participation in various IoT application deployments. Each device (e.g., 105*a,b*) can possess unique hardware, sensors (e.g., 110*a-b*), actuators (e.g., 115*a*), and other logic and components (e.g., 230) to realize the intended function(s) of the device (including driving or otherwise supporting the operation of the respective sensors and actuators, generating data from sensor readings, consuming data for actuator resources, etc.). For instance, devices may be provided with such resources as sensors of varying types (e.g., 110*a*, 110*b*), actuators (e.g., 115*a*) of varying types, energy modules (e.g., batteries, solar cells, etc.), computing resources (e.g., through a respective processor and/or software logic), security features, data storage, and other resources.

An emotion heat map (e.g., generated by an example heat map generation system 225) may realize a variety of value propositions for a business, educational institution, government agency, hospitality enterprise, or other organization managing and promoting a physical space (e.g., a retail store, classroom, museum, park, sports facility, etc.). An emotion heat map, in some implementations, may provide an instantaneous response to the customers or visitors within the physical space based on the real-time/close real-time emotion heat map that generated from the distributed multi-modal sensors. The instantaneous response can correspond to a specific targeted region of the environment or the entire environment. This autonomously generated heat map may or transform a conventional manual customer feedback collection process into an automated process that also provides wider customer coverage with little to no human intervention. Further, given the expanding availability and decreasing cost of sensor devices and computing resources generally, a system implementing the collection of sensor data and generation of corresponding emotion heat maps may be widely scalable across various domains, such as responsive retail, education sector (e.g., smart classroom), smart building, interactive exhibition spaces, and any other application where customer engagement and feedback are of value.

Figure 3:
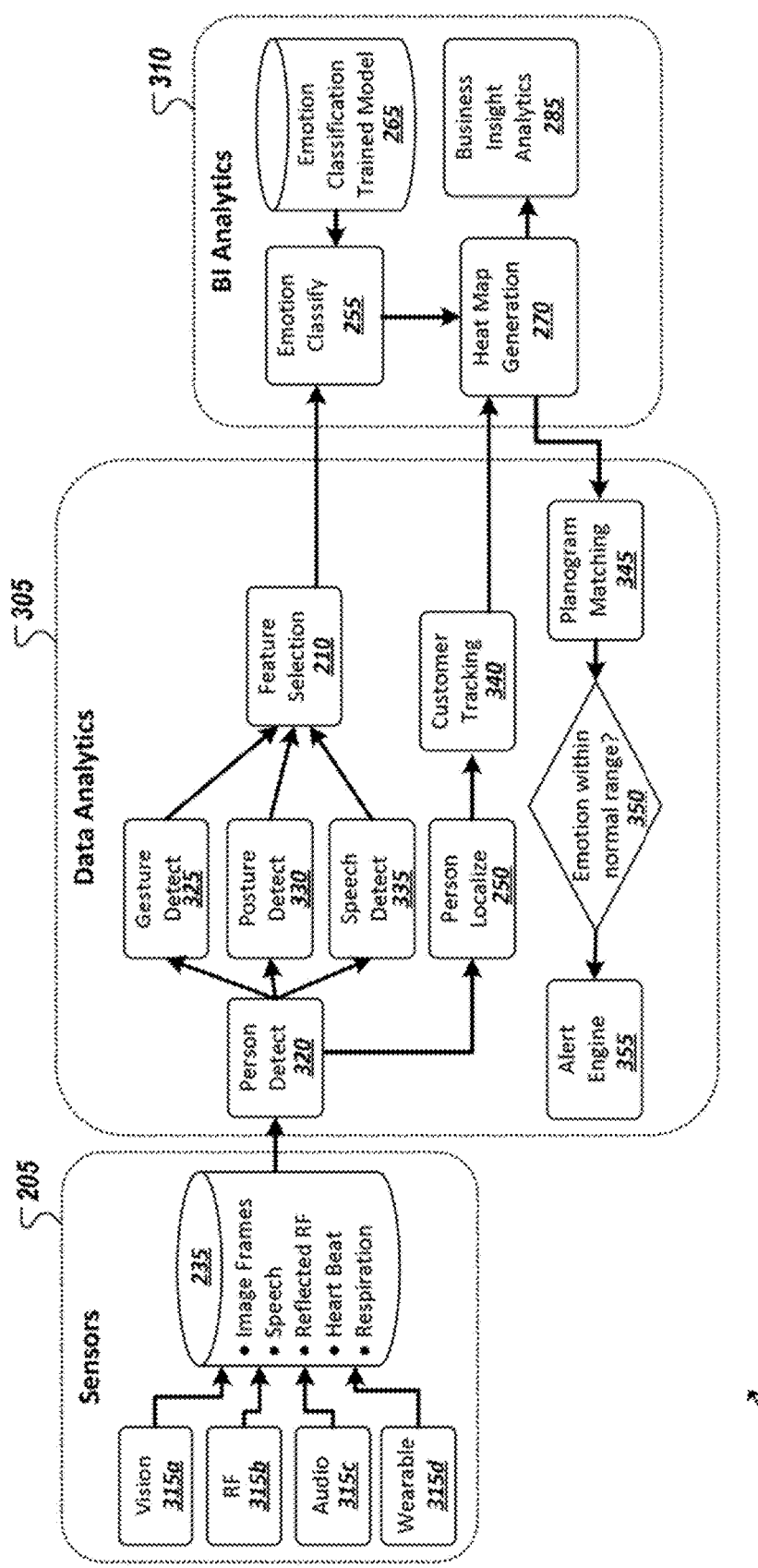
FIG. 3 is a simplified block diagram illustrating an example generation and use of an emotion heat map by a computing system.

Turning to FIG. 3, a simplified block diagram 300 is shown illustrating an example data and process flows within an example computing system to generate and use an example emotion heat map, such as introduced above. The block diagram 300 illustrates a variety of components, which may be implemented in computing systems in hardware circuitry, firmware, instruction set architectures, and/or software. For instance, multiple systems may be employed in some implementations to implement the system and its various components. As an example, an example architecture may be composed of input streaming at edge sensor devices (e.g., 205), customer emotion analytics (e.g., 305) in a cloud or fog-based system, with heat map generation and/or business insight analytics (e.g., 310) provided in the same or a different cloud- or data center-based system, among other example implementations.

In one example, illustrated in FIG. 3, a variety of different sensors of varying modalities may be deployed within a physical environment, including vision sensors (e.g., 315*a*), radio frequency (RF) sensors (e.g., 315*b*), audio sensors (e.g., 315*c*), wearable sensors (e.g., 315*d*), among other examples. Sensors may generate sensor data 235 to capture such information as image frames, speech, voice, reflected radio frequencies, heart beats, human respiration, among other example data. Sensor data 205 may be made available for data analytics 305 beginning, in some implementations, with person detection 320 from the sensor data. Specifically, a sensor or sensor data generated by a sensor may be used to detect the general presence of a person within the environment.

Upon detection of a person, additional analytics may be employed. Analytics 305 may include emotion detection analytics and localization analytics. For instance, In the case of emotion-related feature selection, raw sensor data 235 may be provided such as input image frames, speech signals, reflected RF signals, heart beat signals, respiration signals, etc., which may be preprocessed to denoise and otherwise transform the received data. The pre-process input data stream is then used for person detection. Subsequently, the gesture, human emotion related body variation (e.g. heartbeat, respiration), and speech are extracted from the detected person. For instance, sensor data may be processed for gesture detection 325, posture detection 330, speech detection 335, and other modules to isolate various features observed in the sensor data. The significant emotion features are selected (e.g., using feature selection module 210) via feature extraction/machine learning approach and may be sent to additional processes or systems for further emotion classification and heat mapping.

For localization, the same or different sensor data 235 used during feature selection may be used to perform localization and tracking of individual persons detected (e.g., at 320) within an environment. For instance, various sensors (e.g., RF sensors 315*b*, vision sensors 315*a*, global positioning sensors (e.g., in a wearable device 315d), etc.) may be used to determine a more precise location of a given person within the physical environment. In one example, labels or other reference points may be presented or otherwise defined within the physical environment, which are visible to vision sensors within the environment. These reference points may be used to detect the location in which a person is standing, the path traveled by the person, among other localization and tracking information. In another example, discussed in U.S. patent application Ser. No. 14/229,136 (which is incorporated herein by reference in its entirety), sub-meter accuracy may be obtained in localization results based on Wi-Fi and accelerometers on smartphone. Other example implementations utilizing other sensing technologies and combinations of sensors and corresponding sensor data may also or alternatively be used to determine locations of persons within an environment (e.g., using person localization module 250) and tracking their movement within the environment (e.g., using customer tracking module 340).

In the example of FIG. 3, feature selection 210 may produce feature vectors which may be provided to emotion detection or classification logic (e.g., 255) for determining one or more emotions exhibited by the feature vector(s) or other feature data generated from sensor data 235. Feature data may be provided for processing by the emotion detection logic 255 in connection with a pre-trained model (e.g., 265) used during emotion detection to classify the emotion variation of the subject persons. Localization data (e.g., generated by person localization 250 and/or customer tracking modules 340) may likewise be provided for further analytics. For instance, emotion classification results and localization results may be provided to a heat map generation module 270, which may correlate localization and emotion detection results to determine a mapping between the detection emotions and locations within a physical environment in which these emotions were detected. In other examples, the persons (or data describing the person's features) may be tagged with location information (e.g., determined during person localization 250 or as tagged in the underlying sensor data (e.g., 235) itself) to localize the persons and the emotion results generated for the persons. In this manner, locations may be associated with the determined emotion results. Selected emotion features derived by the emotion classification module may be further used for continuous (and in some cases unsupervised) emotion classifier training and improvement. The resultant output from the emotion classifier 255 and localization engine (e.g., 250, 340) may be provided to the heat map generator 270 to generate a corresponding emotion heat map. For instance, aggregated customer emotion information embodied in emotion heat map data can be compared and transformed into business insights analytics, which may be used to ease subsequent business decisions, among other example advantages and uses.

An emotion heat map generated by a heat map generator (e.g., 270) may, itself, be itself subject to further processing. For instance, the heat map data may be provided to a business insight analytics system 285. In some cases, the location information within the heat map data may be mapped to planogram data describing the environment, which is the subject of the heat map. For instance, planogram matching 345 may be performed to associate planogram data with the emotion heat map. For instance, an emotion heat map may be provided as feedback to be integrated with the local brick-and-mortar planogram (e.g., using planogram matching module 345) to understand customers' emotion engagement and behavior with reference to the product, layout, advertisement, in-store ambience, etc. Such data (and mapping 345 of emotion heat map to planogram) may be aggregated over time to develop an expected baseline response to the physical environment. In some cases, real time, or near real time, analytics may be carried out, for instance to detect (e.g., at 350) where a given customer's emotional response (e.g., as detected using subsequent sensor data 235 processed using emotion classification engine 255) is outside a "normal" or anticipated range. Such instances, or other results described using emotion heat map data, may be used (e.g., by an alert engine 355) to signal actuators, generate human-readable notifications, or trigger other actions, which may allow a manager of the physical environment to initiate or respond (in an automated or manual manner) to address a situation evidenced by the emotion heat map (e.g., interact with the customers, adjust ambient characteristics of designated regions of the environment, etc.), among other example uses.

Figure 4:
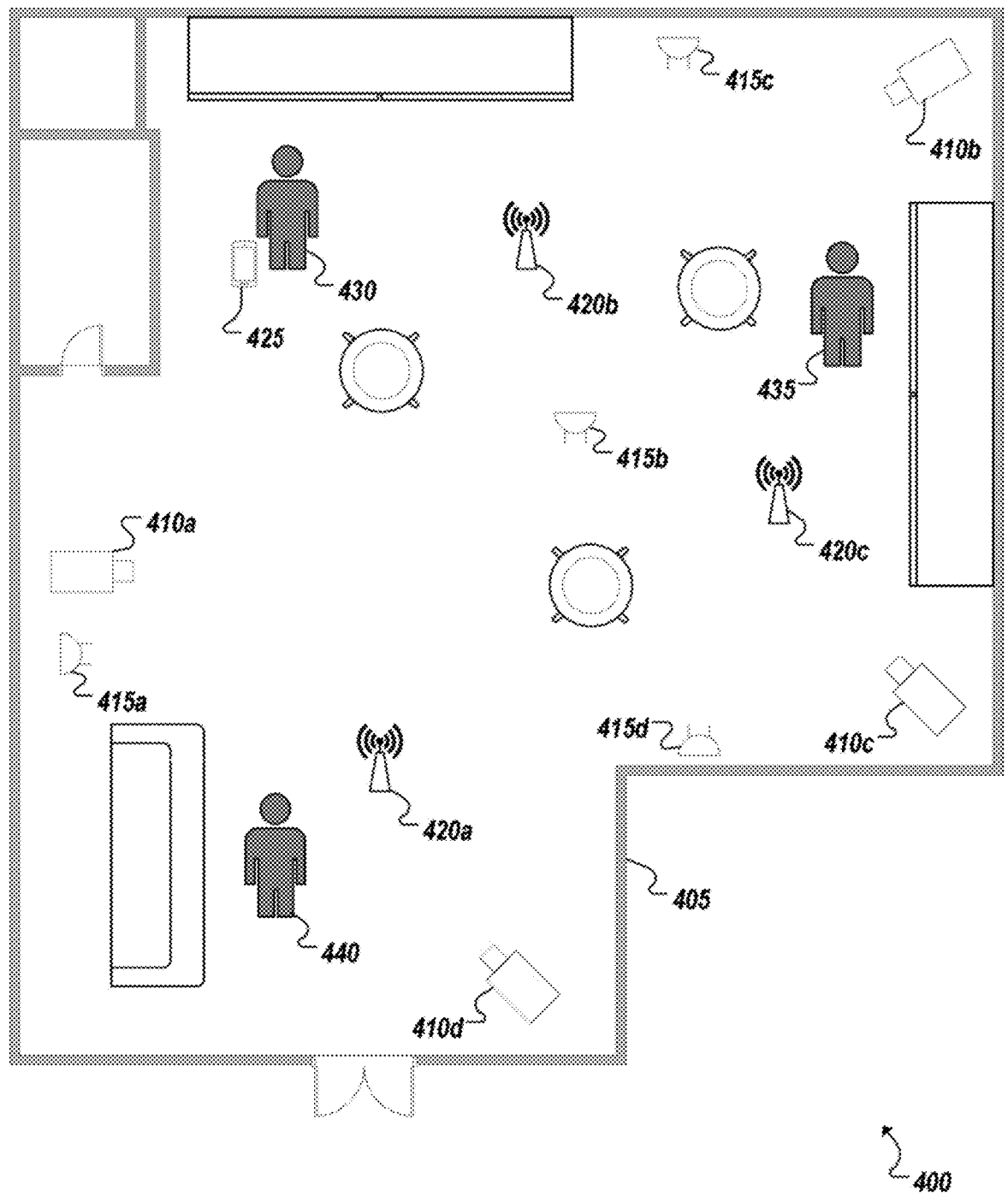
FIG. 4 is a simplified block diagram illustrating an example physical environment equipped with sensor devices.

FIG. 4 is a simplified illustration 400 of an example floorplan of an example physical environment 405. As shown in the example of FIG. 4, the physical environment may be outfitted with a particular layout embodied by various physical characteristics of the environment (e.g., placement of furniture, media played within the environment, HVAC services, product placement, location of cashiers, etc.). Additionally, a variety of different sensors devices (e.g., 410a-d, 415a-d, 420a-c, 425, etc.) may be provided within the environment 405. For instance, some sensors may be fixed or belong explicitly to the environment, such as wall- or ceiling-mounted vision sensors (e.g., 410a-d), audio sensors (e.g., 415a-d), and RF sensors (E.g., 420a-c) among other examples. Other sensor devices (e.g., 425) may belong to users (e.g., 430) visiting the environment 405, with the device (e.g., a smartphone, wearable, or other mobile device) providing sensors and generating signals and/or sensor data which may be detected by or accessed by a heat map generation system.

Further, as illustrated in the example of FIG. 4, various persons (e.g., 430, 435, 440) may enter and exit the particular environment 405. Sensors (e.g., 410a-d, 415a-d, 420a-c, 425, etc.) may be used to detect various physical characteristics of the persons (e.g., 430, 435, 440) to both detect their locations within the particular environment 405 (as well as changes in their location) and detect physical characteristics that may relate to and be used to detect the respective emotions of the persons (as well as changes in their emotions). In some implementations, sensors (e.g., 410a-d, 415a-d, 420a-c, 425, etc.) may be further used to observe and record actions of the respective persons related to their visit to the particular environment. For instance, within a retail context, persons may be tracked to determine whether or not they completed a transaction within the environment (as well as the size and character of the transaction). Such information relating to their transactions may be mapped back to the emotions detected for the person (as well as a corresponding emotion heat map generated based at least partially on the observed visit by the person. Other actions and events may be tracked in other contexts, such as the academic performance of a student within a classroom environment, the amount of time spend by a person in an exhibition space, among other examples. In some cases, observed actions may be mapped to or otherwise associated with emotion detection results and/or emotion heat maps generated based on a person's visit to an environment (e.g., 405).

Figure 5:
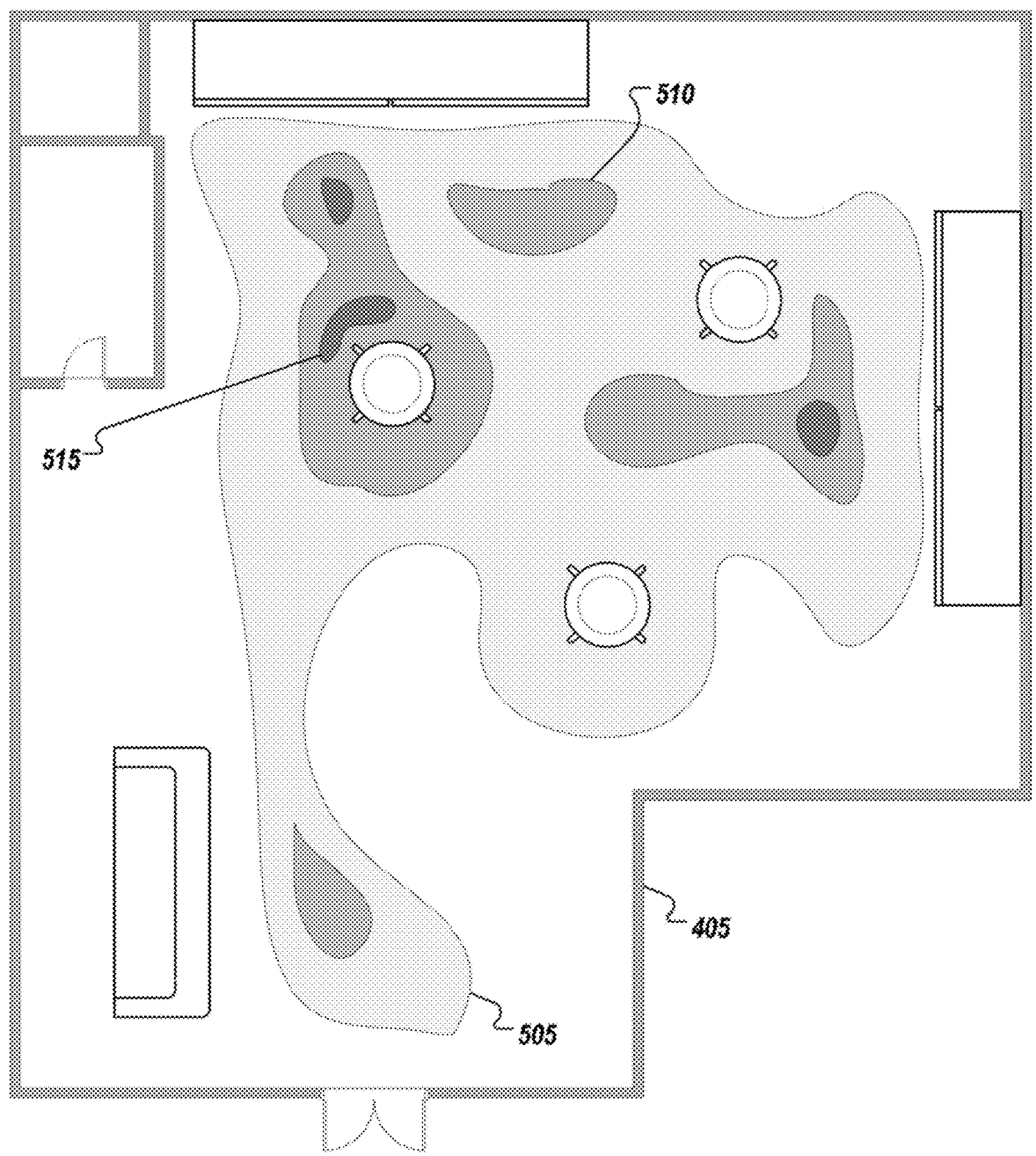
FIG. 5 is a representation of an example emotion heat map.

Turning to FIG. 5, an example presentation 500 of a simplified emotion heat map is shown (e.g., corresponding to the physical environment introduced in the example of FIG. 4). Indeed, sensors (e.g., 410a-d, 415a-d, 420a-c, 425, etc.) provided in an example environment (e.g., 405) may generate data, which may be used to generate a corresponding emotion heat map, such as discussed in the examples above. In one example, a graphical display may be generated from emotion heat map data to present a graphical representation of the emotion heat map to the user (e.g., similar to the representation shown in FIG. 5). For instance, various colored regions (e.g., 505, 510, 515) may be presented as overlaid over various locations of a physical environment 405 to signify emotional responses observed in those locations of the environment 405. For example, these regions (e.g., 505, 510, 515) used in the graphical representation may symbolize particular emotions detected within those regions, the relative degree of emotion observed, and/or the frequency such emotion as observed in persons visiting the environment over time. In some cases, an emotion heat map may be generated for a single person (e.g., based on a single visit and the observed emotions detected for that person as they navigated the physical environment). In other examples, the emotion heat map may be based on localized emotions observed for multiple persons, or a crowd, over a defined window of time. Depending on the granularity of interest, an emotion heat map may be generated to reflect observed localized emotions over a few minutes to several weeks, months, or years, among other examples.

While some of the systems and solutions described and illustrated herein have been described as containing or being associated with various elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be added or may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 6:
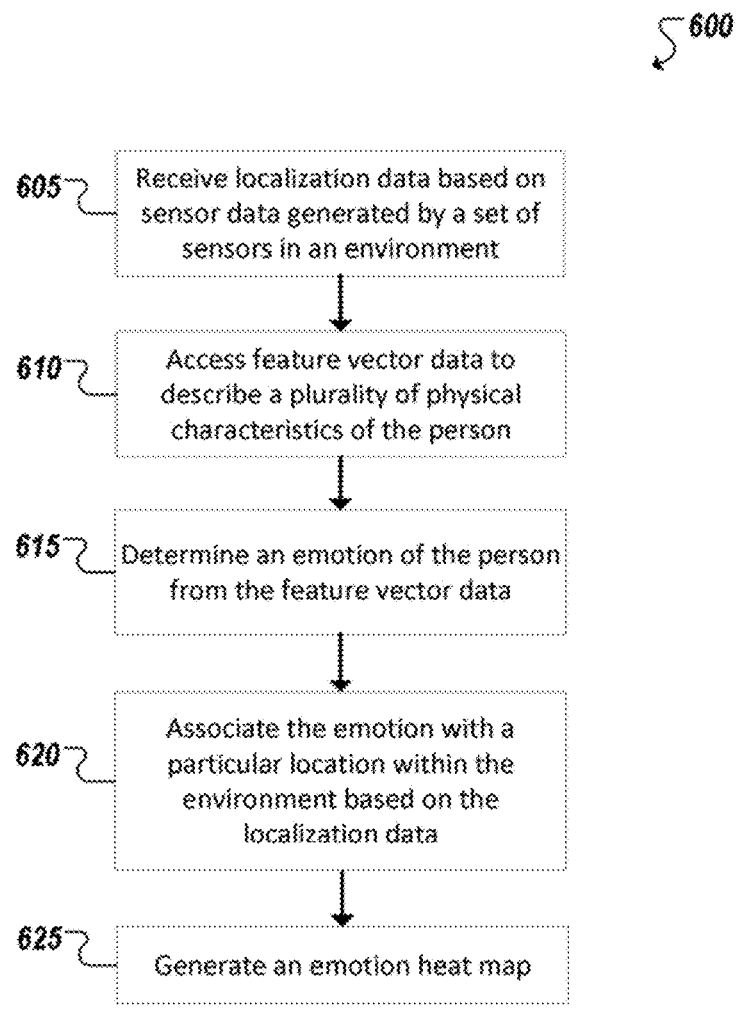
FIG. 6 is a flowchart illustrating an example technique for generating an example emotion heat map.

FIG. 6 is a simplified flowchart 600 illustrating an example technique for generating an example emotion heat map. For instance, localization data may be received 605 or otherwise access, which is generated from sensor data generated by a set of sensors deployed within a physical environment. The localization data may identify that a particular person was present within a particular region or location (i.e., of smaller granularity than the environment) at a particular time. Feature vector data may also be generated from sensor data, such as sensor data generated by multi-modal sensors. The feature vector data may embody a feature vector generated through pre-processing of the sensor data to identify a set of physical characteristics of the particular person measured by the sensors, which are determined to be features for use in detecting an emotion from the particular person. Such physical characteristics features may include such examples as particular facial expressions, gestures, speech, vocal characteristics, heart beat pattern, respiratory pattern, gait, posture, among other example characteristics observed and extracted from the sensor data. The feature vector may be used to determine 615 an emotion of the person. This determined emotion may be associated 620 with location information for the particular person as identified in the localization data. In some cases, associating 620 a detected emotion with location may be based on a computer-performed analysis of the sensor data underlying the feature vector and localization data to determine temporal and physical coincidence of the data. In other cases, the feature vector data and localization data may be tagged to identify the time at which the data was captured, to identify that the data applies to a same detected subject (person), or using other techniques. These tags may be used to associate (e.g., at 620) resulting emotion result data with localization data. In one example, location information may be determined to identify the presence of a particular person in a particular location. This location information may be used to tag sensor data capturing the particular person's physical characteristics while in this location. In this sense, the sensor data is packaged to correspond to the particular person while they are in the particular location, and this package of sensor data may be further processed to generate the feature vector data that is to be used to determine the emotion of the person. Accordingly, in some implementations, the association 620 of the emotion with the particular location may be pre-associated by associating location with the sensor data and/or feature vector used to determine (at 615) the subject person's emotion, among other example implementations. An emotion heat map may be generated 625 based on the association. The heat map may describe the emotions people experience within particular locations within the environment, as detected by the system. Further, in some instances, the emotion heat map may be based on aggregated results detecting the various emotions detected for a multiple people within the various locations of the environment over a period of time, among other examples.

Figure 7:
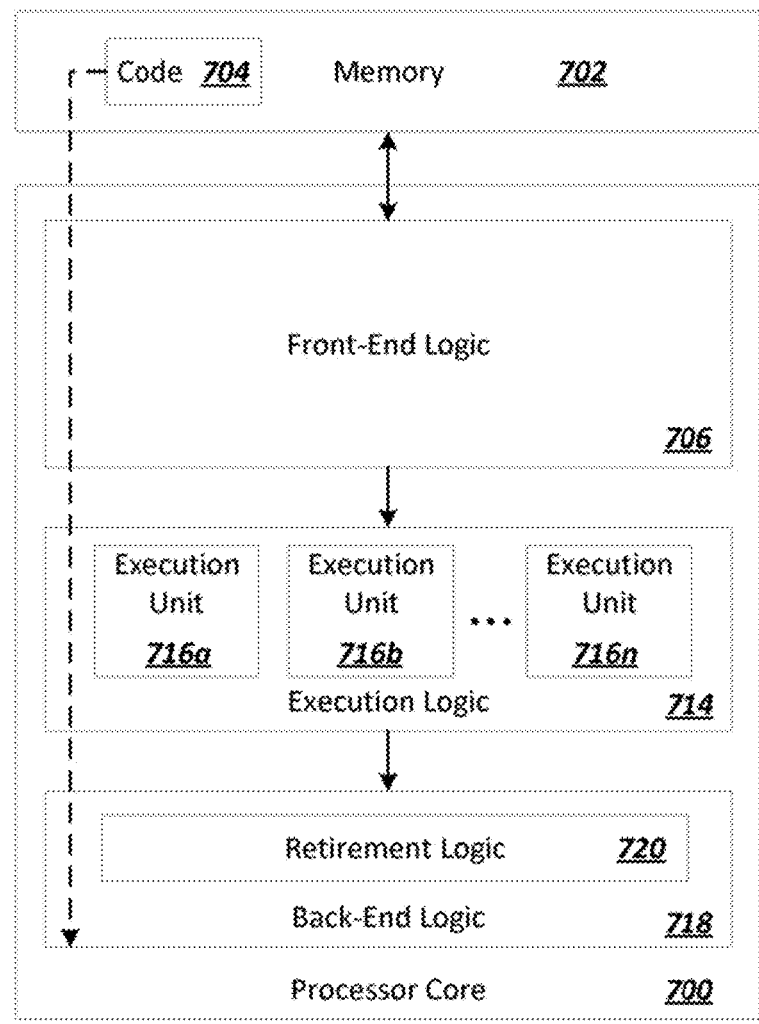
FIG. 7 is a block diagram of an exemplary processor in accordance with one embodiment.
Figure 8:
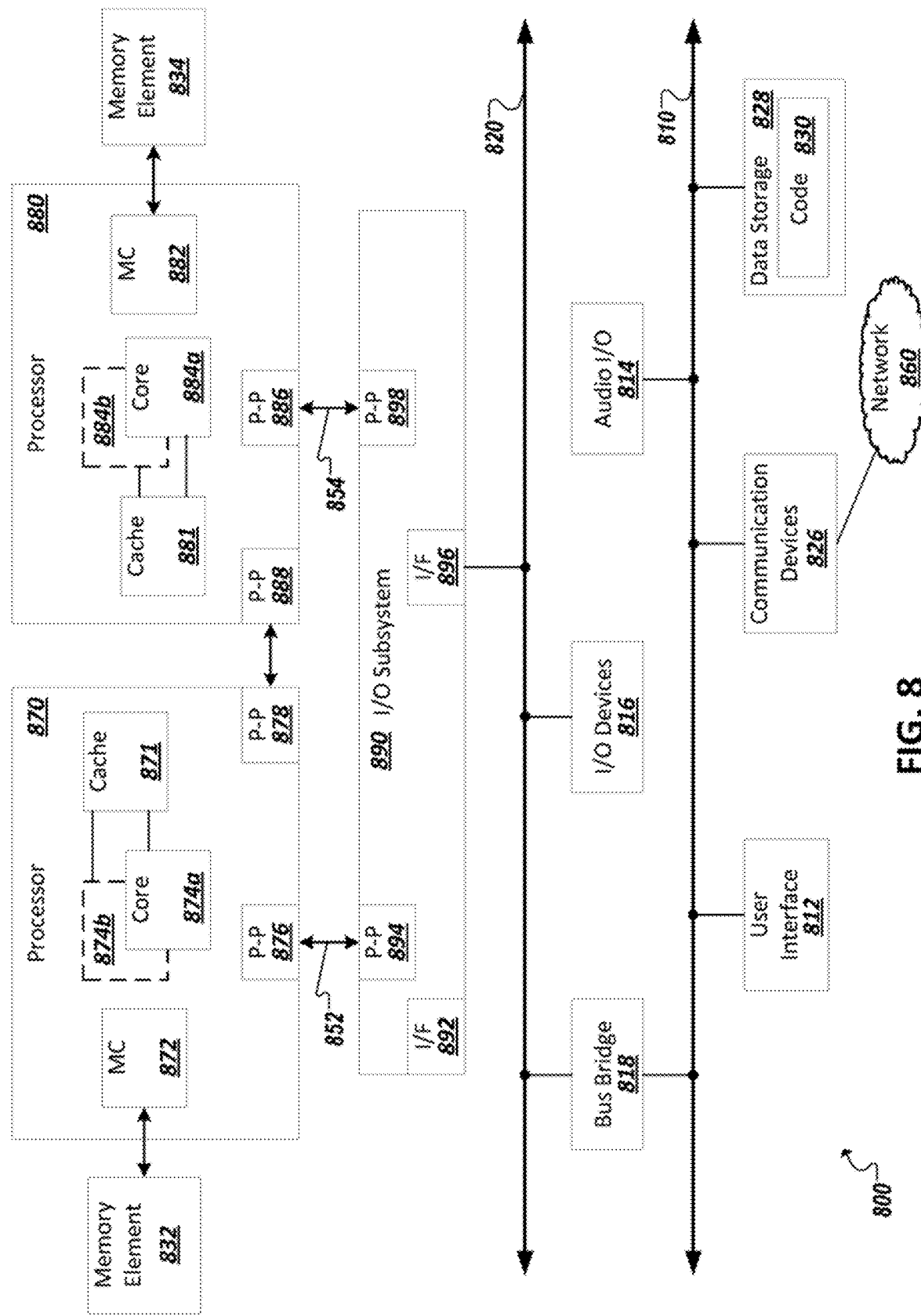
FIG. 8 is a block diagram of an exemplary computing system in accordance with one embodiment.

FIGS. 7-8 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 7-8.

FIG. 7 is an example illustration of a processor according to an embodiment. Processor 700 is an example of a type of hardware device that can be used in connection with the implementations above. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716a, 716b, 716n, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems described herein may be configured in the same or similar manner as computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a user interface 812 (such as a keyboard, mouse, touchscreen, or other input devices), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a non-transitory machine accessible storage medium having instructions stored thereon, the instructions when executed on a machine, cause the machine to: receive localization data based on information collected by one or more sensor devices deployed within an environment, where the localization data identifies presence of a person within a particular location within the environment; access feature vector data, where the feature vector data includes a feature vector including values to describe a plurality of different physical characteristics of the person as measured by a set of one or more sensor devices deployed within the environment when the person was present within the particular location; determine an emotion of the person from the feature vector data; associate the emotion with the particular location within the environment; and generate a heat map of the environment to map emotional responses determined within the environment to specific locations within the environment.

Example 2 may include the subject matter of example 1, where the plurality of different physical characteristics are measured by a plurality of different sensors in the set of sensor devices.

Example 3 may include the subject matter of any one of examples 1-2, where the feature vector is derived by using a model to process raw data generated by the set of sensors to extract information predicted to be useful in determining emotion in persons.

Example 4 may include the subject matter of example 3, where processing the raw data includes using a machine learning model to derive the feature vector.

Example 5 may include the subject matter of example 4, where the machine learning model includes a convolutional neural network.

Example 6 may include the subject matter of any one of examples 3-5, where the instructions, when executed, further cause the machine to receive the raw data from the set of sensor devices over one or more networks.

Example 7 may include the subject matter of any one of examples 1-6, where the feature vector includes values of a subset of the physical characteristics of the person described in sensor data generated by the set of sensor devices contemporaneous with the person being present in the particular location.

Example 8 may include the subject matter of any one of examples 1-7, where the physical characteristics include two or more of gestures of the person, facial expressions of the person, gait of the person, posture of the person, speech of the person, heartbeat of the person, and respiration of the person.

Example 9 may include the subject matter of any one of examples 1-8, where the instructions, when executed, further cause a machine to: identify response data corresponding to the person; and associate the response data with the emotion data, where the response data describes an action taken by the person as reported by one or more device in the environment.

Example 10 may include the subject matter of example 9, where the environment includes an educational environment, and the response data describes academic performance of the person associated with the person being present in the particular location.

Example 11 may include the subject matter of example 9, where the environment includes a retail environment, and the response data describes whether the person participated in transactions within the retail environment after being detected within the particular location.

Example 12 may include the subject matter of example 9, where the action includes an amount of time spent by the person within the particular location.

Example 13 may include the subject matter of any one of examples 1-12, where generating the heat map includes: accessing emotion data describing emotions detected for a plurality of persons within the environment, where the heat map is generated to reflect the emotions detected for the plurality of persons within different locations within the environment.

Example 14 may include the subject matter of example 13, where the heat map is based on emotions detected in persons in the environment measured during a particular window of time.

Example 15 is a computer-implemented method including: receiving localization data based on information collected by one or more sensor devices deployed within an environment, where the localization data identifies presence of a person within a particular location within the environment; access feature vector data, where the feature vector data includes a feature vector including values to describe a plurality of different physical characteristics of the person as measured by a set of one or more sensor devices deployed within the environment when the person was present within the particular location; determining an emotion of the person from the feature vector data; associating the emotion with the particular location within the environment; and generating a heat map of the environment to map emotional responses determined within the environment to specific locations within the environment.

Example 16 may include the subject matter of example 15, where the plurality of different physical characteristics are measured by a plurality of different sensors in the set of sensor devices.

Example 17 may include the subject matter of any one of examples 15-16, where the feature vector is derived by using a model to process raw data generated by the set of sensors to extract information predicted to be useful in determining emotion in persons.

Example 18 may include the subject matter of example 17, where processing the raw data includes using a machine learning model to derive the feature vector.

Example 19 may include the subject matter of example 18, where the machine learning model includes a convolutional neural network.

Example 20 may include the subject matter of any one of examples 17-19, further including receiving the raw data from the set of sensor devices over one or more networks.

Example 21 may include the subject matter of any one of examples 15-20, where the feature vector includes values of a subset of the physical characteristics of the person described in sensor data generated by the set of sensor devices contemporaneous with the person being present in the particular location.

Example 22 may include the subject matter of any one of examples 15-21, where the physical characteristics include two or more of gestures of the person, facial expressions of the person, gait of the person, posture of the person, speech of the person, heartbeat of the person, and respiration of the person.

Example 23 may include the subject matter of any one of examples 15-22, further including: identifying response data corresponding to the person; and associating the response data with the emotion data, where the response data describes an action taken by the person as reported by one or more device in the environment.

Example 24 may include the subject matter of example 23, where the environment includes an educational environment, and the response data describes academic performance of the person associated with the person being present in the particular location.

Example 25 may include the subject matter of example 23, where the environment includes a retail environment, and the response data describes whether the person participated in transactions within the retail environment after being detected within the particular location.

Example 26 may include the subject matter of example 23, where the action includes an amount of time spent by the person within the particular location.

Example 27 may include the subject matter of any one of examples 15-26, where generating the heat map includes: accessing emotion data describing emotions detected for a plurality of persons within the environment, where the heat map is generated to reflect the emotions detected for the plurality of persons within different locations within the environment.

Example 28 may include the subject matter of example 27, where the heat map is based on emotions detected in persons in the environment measured during a particular window of time.

Example 29 is a system including means to perform the method of any one of examples 15-28.

Example 30 is a system including: a data processing apparatus; a memory; and a localization engine executable by the data processing apparatus to: receive localization data based on information collected by one or more sensor devices deployed within an environment; determine, from the localization data, the presence of a person within a particular location within the environment at a particular time. The system may further include an emotion detection engine executable by the data processing apparatus to: access feature vector data, where the feature vector data includes a feature vector including values to describe a plurality of different physical characteristics of the person as measured by a set of one or more sensor devices deployed within the environment at or near the particular time; determine an emotion of the person from the feature vector data. Additionally, the system may include a heat map generator executable by the data processing apparatus to: receive location determination data generated by the localization engine, where the location determination data identifies the presence of the person at the particular location at the particular time; receive emotion data generated by the emotion detection engine, where the location determination data describes the emotion of the person detected at or near the particular time; and generate, based on the location determination data and emotion data, a heat map of the environment to map emotional responses determined within the environment to specific locations within the environment.

Example 31 may include the subject matter of example 30, further including the set of sensors, where the set of sensor devices includes two or more of a camera device, a microphone, a heartbeat monitor, and a respiration monitor.

Example 32 may include the subject matter of any one of examples 30-31, where at least a particular one of the set of sensors generates data usable by the localization engine to determine presence of the person within the particular location and further for inclusion within the feature vector for use in determining emotion of the person.

Example 33 may include the subject matter of example 32, where the particular sensor includes a mobile computing device associated with the person.

Example 34 may include the subject matter of any one of examples 30-33, further including a graphical display to generate a graphical representation of the heat map for presentation to a user.

Example 35 may include the subject matter of any one of examples 30-34, where the plurality of different physical characteristics are measured by a plurality of different sensors in the set of sensor devices.

Example 36 may include the subject matter of any one of examples 30-35, further including a sensor data processing engine to derive the feature vector by using a model to process raw data generated by the set of sensors to extract information predicted to be useful in determining emotion in persons.

Example 37 may include the subject matter of example 36, where processing the raw data includes using a machine learning model to derive the feature vector.

Example 38 may include the subject matter of example 37, where the machine learning model includes a convolutional neural network.

Example 39 may include the subject matter of any one of examples 36-38, where the sensor data processing engine is to receive the raw data from the set of sensor devices over one or more networks.

Example 40 may include the subject matter of any one of examples 30-39, where the feature vector includes values of a subset of the physical characteristics of the person described in sensor data generated by the set of sensor devices contemporaneous with the person being present in the particular location.

Example 41 may include the subject matter of any one of examples 30-40, where the physical characteristics include two or more of gestures of the person, facial expressions of the person, gait of the person, posture of the person, speech of the person, heartbeat of the person, and respiration of the person.

Example 42 may include the subject matter of any one of examples 30-41, further including a business analytics engine to: identify response data corresponding to the person; and associate the response data with the emotion data, where the response data describes an action taken by the person as reported by one or more device in the environment.

Example 43 may include the subject matter of example 42, where the environment includes an educational environment, and the response data describes academic performance of the person associated with the person being present in the particular location.

Example 44 may include the subject matter of example 42, where the environment includes a retail environment, and the response data describes whether the person participated in transactions within the retail environment after being detected within the particular location.

Example 45 may include the subject matter of example 42, where the action includes an amount of time spent by the person within the particular location.

Example 46 may include the subject matter any one of examples 30-45, where generating the heat map includes: accessing emotion data describing emotions detected for a plurality of persons within the environment, where the heat map is generated to reflect the emotions detected for the plurality of persons within different locations within the environment.

Example 47 may include the subject matter of example 46, where the heat map is based on emotions detected in persons in the environment measured during a particular window of time.

Example 48 may include the subject matter of any one of examples 30-47, where the is implemented using a collection of fog computing resources.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one machine accessible storage medium having instructions stored thereon, the instructions when executed on a machine, cause the machine to:
   receive localization data based on information collected by one or more sensor devices deployed within an environment, wherein the localization data identifies presence of a person within a particular location within the environment;
   access sensor data generated by a plurality of sensors, wherein the plurality of sensors monitor the particular location;
   provide the sensor data as an input to a first machine learning model to derive, as an output of the first machine learning model, a feature vector based on the sensor data, wherein the feature vector is to describe a particular set of features of the person, wherein the particular set of features comprises values to describe a plurality of different physical characteristics of the person as measured by a set of one or more sensor devices deployed within the environment when the person was present within the particular location;
   provide the feature vector as an input to a second machine learning model to determine, from an output of the second machine learning model, an emotion of the person;
   associate the emotion with the particular location within the environment; and
   generate a heat map of the environment to map emotional responses determined within the environment to specific locations within the environment.

2. The storage medium of claim 1, wherein the plurality of different physical characteristics are measured by a plurality of different sensors in the set of sensor devices.

3. The storage medium of claim 1, wherein the feature vector is adapted to the second machine learning model.

4. The storage medium of claim 1, wherein the instructions, when executed, further cause the machine to:
   access second sensor data corresponding to presence of the person in a second location in the environment;
   derive a second feature vector from the second sensor data using the first machine learning model; and
   provide the second feature vector to the second machine learning model to determine an emotion of the person associated with the second location.

5. The storage medium of claim 1, wherein at least one of the first or second machine learning model comprises a convolutional neural network.

6. The storage medium of claim 1, wherein the instructions, when executed, further cause the machine to receive the sensor data from the set of sensor devices over one or more networks.

7. The storage medium of claim 1, wherein the feature vector comprises values of a subset of the physical characteristics of the person described in sensor data generated by the set of sensor devices contemporaneous with the person being present in the particular location.

8. The storage medium of claim 1, wherein the physical characteristics comprise two or more of gestures of the person, facial expressions of the person, gait of the person, posture of the person, speech of the person, heartbeat of the person, and respiration of the person.

9. The storage medium of claim 1, wherein the instructions, when executed, further cause a machine to:
identify response data corresponding to the person;
associate the response data with the emotion data, wherein the response data describes an action taken by the person as reported by one or more devices in the environment.

10. The storage medium of claim 9, wherein the environment comprises an educational environment, and the response data describes academic performance of the person associated with the person being present in the particular location.

11. The storage medium of claim 9, wherein the environment comprises a retail environment, and the response data describes whether the person participated in transactions within the retail environment after being detected within the particular location.

12. The storage medium of claim 9, wherein the action comprises an amount of time spent by the person within the particular location.

13. The storage medium of claim 1, wherein generating the heat map comprises:
accessing emotion data describing emotions detected for a plurality of persons within the environment, wherein the heat map is generated to reflect the emotions detected for the plurality of persons within different locations within the environment.

14. The storage medium of claim 13, wherein the heat map is based on emotions detected in persons in the environment measured during a particular window of time.

15. A method comprising:
receiving localization data based on information collected by one or more sensor devices deployed within an environment, wherein the localization data identifies presence of a person within a particular location within the environment;
accessing sensor data generated by a plurality of sensors, wherein the plurality of sensors monitor the particular location;
providing the sensor data as an input to a first machine learning model to derive, as an output of the first machine learning model, a feature vector based on the sensor data, wherein the feature vector is to describe a particular set of features of the person, wherein the particular set of features comprises values to describe a plurality of different physical characteristics of the person as measured by a set of one or more sensor devices deployed within the environment when the person was present within the particular location;
providing the feature vector as an input to a second machine learning model to determine an emotion of the person from the feature vector data;
associating the emotion with the particular location within the environment; and
generating a heat map of the environment to map emotional responses determined within the environment to specific locations within the environment.

16. A system comprising:
a data processing apparatus;
a memory; and
localization engine executable by the data processing apparatus to:
receive localization data based on information collected by one or more sensor devices deployed within an environment;
determine, from the localization data, the presence of a person within a particular location within the environment at a particular time;
a sensor processing engine executable by the data processing apparatus to:
access sensor data generated by a plurality of sensors, wherein the plurality of sensors monitor the particular location; and
provide the sensor data as an input to a first machine learning model to derive, as an output of the first machine learning model, a feature vector based on the sensor data, wherein the feature vector is to describe a particular set of features of the person, wherein the particular set of features comprises values to describe a plurality of different physical characteristics of the person;
emotion detection engine executable by the data processing apparatus to:
provide the feature vector as an input to a second machine learning model; and
determine, using the second machine learning model, an emotion of the person from the feature vector; and
a heat map generator executable by the data processing apparatus to:
receive location determination data generated by the localization engine, wherein the location determination data identifies the presence of the person at the particular location at the particular time;
receive emotion data generated by the emotion detection engine, wherein the location determination data describes the emotion of the person detected at or near the particular time; and
generate, based on the location determination data and emotion data, a heat map of the environment to map emotional responses determined within the environment to specific locations within the environment.

17. The system of claim 16, further comprising the set of sensors, wherein the set of sensor devices comprises two or more of a camera device, a microphone, a heartbeat monitor, and a respiration monitor.

18. The system of claim 16, wherein at least a particular one of the set of sensors generates data usable by the localization engine to determine presence of the person within the particular location and further for inclusion within the feature vector for use in determining emotion of the person.

19. The system of claim 18, wherein the particular sensor comprises a mobile computing device associated with the person.

20. The system of claim 16, further comprises a graphical display to generate a graphical representation of the heat map for presentation to a user.

* * * * *